W. COOPER.
ELECTRIC MOTOR CONTROL SYSTEM.
APPLICATION FILED APR. 10, 1905.
912,995.
Patented Feb. 23, 1909.
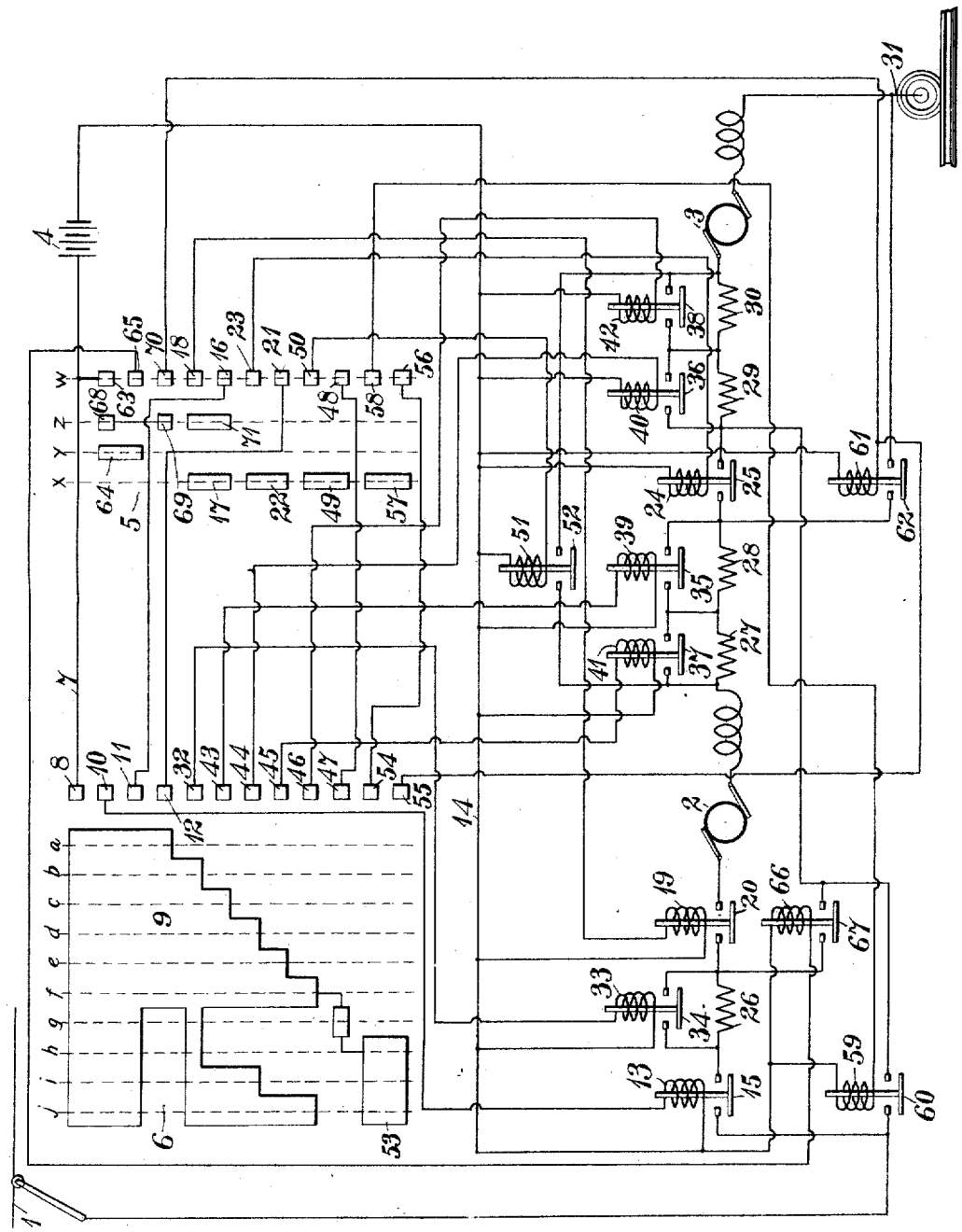
WITNESSES:
Fred H. Miller
R. A. Dearborn.
INVENTOR
William Cooper
BY
Chisley S. Carr
ATTORNEY

UNITED STATES PATENT OFFICE.

WILLIAM COOPER, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-MOTOR-CONTROL SYSTEM.

No. 912,995.    Specification of Letters Patent.    Patented Feb. 23, 1909.

Application filed April 10, 1905. Serial No. 254,771.

*To all whom it may concern:*

Be it known that I, WILLIAM COOPER, a citizen of the United States, and a resident of Wilkinsburg, in the county of Allegheny and State of Pennsylvania, have invented a new and useful Improvement in Electric-Motor-Control Systems, of which the following is a specification.

My invention relates to systems of electric motor control and has special reference to systems that are adapted for railway service.

The object of my invention is to provide, in an auxiliary control system, means for cutting out any one motor of an equipment without interfering with the control of the remaining motors.

In the prior art, when auxiliary control systems were applied to a single car, or for multiple operation of a train, the whole car became inoperative if a single motor was rendered unserviceable for any reason, unless a system of switches was provided to modify the connections of the main motor circuits so that any one motor could be cut out. However, when a motor was cut out in this way, the operation, by the auxiliary control system, of the remaining motor or motors of the equipment was usually unsatisfactory. By the use of my invention, the auxiliary control system is modified by a selective switch that may occupy any one of a plurality of predetermined positions to operate a part or the whole of the equipment in a proper manner by the normal action of the master controller.

The single figure of the accompanying drawing discloses a diagrammatic view of a system embodying my invention and comprising a two-motor equipment arranged for series and multiple operation.

Although a single arrangement is shown and described, I desire that my invention shall not be confined or restricted to any specific arrangement, for it may and probably will be applied to a two or a four-motor equipment arranged for series and multiple operation in either direction, and may embody either automatic acceleration or hand-operated master switch control, as shown.

Referring to the drawing, electrical energy is supplied from a line conductor 1 to a plurality of motors 2 and 3, which are controlled by an auxiliary system supplied with direct current energy from a battery 4, and comprising a motor-selective switch 5 and a master controller 6. The master controller 6 may be operated through a series of positions $a, b, c, d, e, f, g, h, i$ and $j$, and the selective switch 5 may occupy any one of positions $w, x, y$ and $z$, which respectively determine whether neither motor, both motors, only the motor 3 or only the motor 2 are in use. When the switch 5 occupies position $x$ and the controller 6 is moved to position $a$, energy from the battery 4 is supplied through a conductor 7, contact finger 8 and ring segment 9 to a plurality of contact fingers 10, 11 and 12. The finger 10 is connected, through magnet coil 13, to the battery line conductor 14 and the coil is energized to operate a switch 15. The contact finger 11 is connected through contact finger 16 of the selective switch 5, ring segment 17, contact finger 18 and a magnet coil 19, to the conductor 14, the winding 19 being thus energized to operate a switch 20. The finger 12 is connected through finger 21, ring segment 22, finger 23, and magnet winding 24, to the conductor 14, the magnet winding being thus energized to close a switch 25.

When the controller 6 occupies position $a$, main line connections are completed from the conductor 1 through the switch 15, a resistance 26, the switch 20, the motor 2, the two resistance portions 27 and 28, the switch 25, two other resistance portions 29 and 30, and the motor 3, to a corresponding main line terminal 31. Thus the two motors of the equipment are connected in series, with the resistances 26, 27, 28, 29 and 30 in circuit. When the master controller 6 is moved to the position $b$, a contact finger 32 engages the ring segment 9, from which it is supplied with energy from the battery 4 and energizes the magnet winding 33, which closes a switch 34 and thereby short-circuits the resistance 26, since the finger 32 is connected directly through the winding 33 to the negative conductor 14. As the controller 6 is moved successively to the positions $c, d, e$ and $f$, the resistance portions 28, 29, 27 and 30 are respectively short-circuited by the switches 35, 36, 37 and 38, which are respectively actuated by windings 39, 40, 41 and 42. The windings 39, 40, 41 and 42 are supplied with energy through the contact fingers 43, 44, 45 and 46, which are successively engaged by ring segment 9 and are thus supplied with energy from the battery 4 and are finally connected to the negative conductor 14. When the controller 6 occupies the position $f$, the motors 2 and 3 are still connected in series, but all the resistance is cut out of the circuit. As the controller 6 moves to the position $g$, the fingers 12, 43, 44, 45 and 46 become disengaged from the ring segment 9, while a finger 47 moves into engagement therewith and supplies energy through a finger 48 of the selective switch 5, ring segment 49 and finger 50, to a magnet winding 51, the opposite terminal of which is connected to the negative conductor 14. The magnet winding 51, when energized, closes a switch 52, which connects a single conductor from one terminal of the motor 2 to one terminal of the motor 3 and consequently short-circuits the resistance portions 27, 28, 29 and 30 and the switch 25. The disengagement of the fingers 43, 44, 45 and 46 de-magnetizes the windings 39, 40, 41 and 42 and causes the solenoid switches 35, 36, 37 and 38 to open, and the disengagement of the finger 12 deënergizes the winding 24 and allows the switch 25 to open. As the controller 6 approaches the position $h$, energy is supplied from ring segment 9, through ring segment 53, to fingers 54 and 55. The finger 54 is connected, through the finger 56 of the switch 5, segment 57 and finger 58, to a magnet winding 59, the opposite terminal of which is connected to the negative line conductor 14. The winding 59, when energized, closes the switch 60 and the winding 61, one terminal of which is connected directly to the finger 55 and the other terminal to the negative battery conductor 14, when energized, closes a switch 62. As the controller 6 moves positively into the position $h$, the finger 47 becomes disengaged from the ring segment 9, and the winding 51, being thus deënergized, allows the switch 52 to open. This, however, occurs after the switches 60 and 62 have closed. The motors 2 and 3 are thus connected at this point in multiple, the resistance portions 27 and 28 are in series with the motor 2 and the resistance portions 29 and 30 are in series with the motor 3. As the controller 6 moves to the positions $i$ and $j$, resistance portions 28 and 29 are first short-circuited by the reëngagement of the fingers 43 and 44 and the ring segment 9, which again energizes the windings 39 and 40 and closes the switches 35 and 36, after which the fingers 45 and 46 are brought into engagement with the ring segment 9 and the windings 41 and 42 are reënergized to close the switches 37 and 38 and thus short-circuit the resistance portions 27 and 30. When the controller 6 occupies the position $j$, which is the full running position of the equipment, the motors 2 and 3 are connected in multiple with no resistance in the circuit.

In case the motor 2 becomes disabled or unfit for service, so that it is desirable to operate the remainder of the equipment without it, the selective switch 5 may be moved to the position $y$, after the master controller 6 is moved to the "off" position, in which case energy is supplied from the battery 4, through finger 63, ring segment 64, and finger 65, to a magnet winding 66, the other terminal of which is connected to the negative conductor 14 and is energized to close the solenoid switch 67. Furthermore, the fingers 18, 23, 50 and 58 are disengaged from the ring segments 17, 22, 49 and 57, respectively, when the selective switch 5 moves to the position $y$, so that it is impossible to energize the windings 19, 24, 51 and 59 by means of the controller 6. As the controller 6 is moved to the position $a$, energy is supplied the same as before to close the switch 15, which allows energy to be supplied from the conductor 1, through the switch 15, the resistance 26, the switch 67, resistance portions 29 and 30, to the motor 3, the other terminal of which is connected to the opposite line conductor 31. As the controller 6 is moved successively to the positions $b$, $c$, $d$, $e$ and $f$, resistance portions 28, 29, 27 and 30 are short-circuited, as hereinbefore explained, and thus the single motor 3 is connected directly across the line when the controller 6 occupies position $f$, which is the full running position for the single motor.

Should the motor 3 be disabled while the motor 2 still remains operative, the selective switch 5 may be moved to the position $z$, the controller 6 being first moved to the "off" position, in which case, energy is supplied from the battery 4, through the finger 63, ring segments 68 and 69, finger 70, and the winding 61, which is thus energized and closes the switch 62. Furthermore, when the switch 5 occupies the position $z$, the fingers 23, 50 and 58 are disengaged from the ring segments 17, 22, 49 and 57, so that the switches 25, 52 and 60 may not be closed. The fingers 16 and 18, however, engage a segment 71 which corresponds to the ring segment 17 and permits the switch 20 to be closed, the same as when both motors are in operation. In this case, when the controller 6 occupies the position $a$, a circuit is completed through fingers 10 and 11 to close the switches 15 and 20, and energy is supplied from the main line conductor 1, through switch 15, resistance 26, switch 20, to the motor 2, the other terminal of which is connected through the resistance portions 27 and 28 and the switch 62 to the opposite line conductor 31. As the controller is then moved successively to the positions $b$, $c$, $d$, $e$ and $f$, resistance portions 26, 27 and 28 are short-circuited, leaving the motor 2 directly across the line when the controller 6 is in position $f$, which is the full running position of the motor 2.

When the selective switch 5 occupies the position *w*, the master controller 6 may be operated without supplying energy to either motor of the equipment. This arrangement permits the operation of a train, equipped for multiple control, from a car on which none of the motors are operative.

I claim as my invention:

1. The combination with a plurality of electric motors and an auxiliary control system which is governed by a master controller to regulate the connections thereof and the amount of resistance inserted in the circuit therewith, of means for so modifying said auxiliary control system that one of said motors may be excluded from said circuit and the other motor be properly controlled by normal operation of the said master controller, said means comprising a selective controlling switch which may occupy any one of a plurality of positions.

2. The combination with two electric motors and an auxiliary control system which is governed by a master controller to successively connect both motors in series with a predetermined resistance, gradually decrease said resistance, connect said motors in parallel with a predetermined resistance in series with each motor and gradually and simultaneously decrease said resistance, of means for so modifying said control system that the normal operation of said master controller may successively connect one of said motors in circuit with a predetermined resistance and gradually decrease said resistance, that comprises a selective controlling switch having a plurality of positions, one of said positions providing for normal operation of both motors, a second providing for proper operation of only one of the motors, a third providing for operation of only the other motor and a fourth preventing the operation of either motor.

3. The combination with a vehicle equipment comprising a control system governed by a master controller, two electric motors and resistances therefor, of a selective controlling switch having a plurality of positions by which said control system may be so modified as to insure either successive connection of both motors in series with a predetermined resistance, a gradual decrease of said resistance, parallel connection of said motors with a predetermined resistance in series with each motor, a gradual and simultaneous decrease of said resistances, or a connection of either one of said motors in circuit with a predetermined resistance and a gradual decrease of said resistance, while the other motor is open-circuited, when the master controller successively occupies a series of positions.

4. In an electric vehicle, the combination with a plurality of electric driving motors and a plurality of independently actuated switches for adjusting the circuits thereof, of means for preventing operation of certain of the switches to exclude one or more of the motors from the circuit without interfering with the adjustment of the circuits of the remaining motors.

5. In an electric vehicle, the combination with a plurality of electric driving motors, and independently actuated switches for adjusting the circuits thereof, of means for preventing operation of certain of the switches to exclude one or more of the motors from the circuit without interfering with the adjustment of the circuits of the remaining motors, said means comprising a selective controlling switch that may occupy any one of a plurality of positions.

In testimony whereof, I have hereunto subscribed my name this 8th day of April, 1905.

WILLIAM COOPER.

Witnesses:
 Osy Sandborgh,
 Birney Hines.